United States Patent
Hayashi et al.

(10) Patent No.: US 12,042,946 B2
(45) Date of Patent: Jul. 23, 2024

(54) ELECTRIC SCISSORS

(71) Applicant: MAX CO., LTD., Tokyo (JP)

(72) Inventors: Susumu Hayashi, Tokyo (JP); Shinichi Ohkubo, Tokyo (JP)

(73) Assignee: Max Co., Ltd., Tokyo (JP)

( * ) Notice: Subject to any disclaimer, the term of this patent is extended or adjusted under 35 U.S.C. 154(b) by 175 days.

(21) Appl. No.: 17/243,749

(22) Filed: Apr. 29, 2021

(65) Prior Publication Data

US 2021/0339410 A1    Nov. 4, 2021

(30) Foreign Application Priority Data

Apr. 30, 2020    (JP) ................................. 2020-080673

(51) Int. Cl.
    *B26B 15/00*     (2006.01)
    *B26B 17/00*     (2006.01)

(52) U.S. Cl.
    CPC .............. *B26B 15/00* (2013.01); *B26B 17/00* (2013.01)

(58) Field of Classification Search
    CPC ......... B26B 15/00; B26B 13/00; B26B 17/00; B26B 29/04; A01G 2003/023; B23D 21/06; B23D 21/10; B23D 29/002; B23D 29/023
    USPC .................................................... 30/228, 233
    See application file for complete search history.

(56) References Cited

U.S. PATENT DOCUMENTS

| | | | | |
|---|---|---|---|---|
| 1,279,389 A | * | 9/1918 | Malsin | B26B 29/04 30/233 |
| 2,268,728 A | * | 1/1942 | Toop | B26B 15/00 30/228 |
| 2,591,740 A | * | 4/1952 | Stillwell et al. | B26B 13/00 D8/57 |
| 2,775,032 A | | 12/1956 | Sorensen | |
| 3,010,206 A | * | 11/1961 | Curry | B23D 29/023 30/233 |
| 3,710,445 A | * | 1/1973 | Roth | B26B 15/00 30/228 |
| 4,807,363 A | * | 2/1989 | Clifton, Jr. | B26B 15/00 30/229 |
| 5,398,415 A | | 3/1995 | Collins, Jr. | |
| 5,566,454 A | * | 10/1996 | Eisenbraun | B26B 15/00 30/228 |
| 5,993,303 A | * | 11/1999 | Fladgard | B26B 15/00 30/228 |

(Continued)

FOREIGN PATENT DOCUMENTS

| | | |
|---|---|---|
| CN | 107889635 A | 4/2018 |
| DE | 610644 C | 3/1935 |

(Continued)

OTHER PUBLICATIONS

Extended European Search Report for EP Application No. 21170703.9 dated Sep. 8, 2021 (7 pages).
Jun. 1, 2024—(CN) Office Action—CN App 202110465563.8, Eng Tran.

*Primary Examiner* — Jason Daniel Prone
(74) *Attorney, Agent, or Firm* — Banner & Witcoff, Ltd.

(57) ABSTRACT

Electric scissors includes at least one movable blade having a blade portion which cuts a to-be-cut object. A drive unit opens and closes the at least one movable blade, and a holding part holds the to-be-cut object that is cut by the at least one movable blade. A support part supports the to-be-cut object, which is cut by the at least one movable blade, while regulating a direction of the to-be-cut object.

7 Claims, 10 Drawing Sheets

(56) References Cited

U.S. PATENT DOCUMENTS

| | | | | |
|---|---|---|---|---|
| 6,145,203 | A  * | 11/2000 | Appleman | B23D 29/02 30/233 |
| 6,640,441 | B1 * | 11/2003 | Huang | B23D 21/06 30/233 |
| 7,231,860 | B1 * | 6/2007 | Mizukawa | B23D 17/02 83/569 |
| 7,421,788 | B2 * | 9/2008 | Gardner | B25G 3/38 30/233 |
| 9,630,265 | B2 * | 4/2017 | Figiel | B23D 29/002 |
| 10,960,473 | B2 * | 3/2021 | D'Antuono | B26B 15/00 |
| 2011/0214292 | A1 | 9/2011 | Heh | |
| 2011/0314680 | A1 * | 12/2011 | Zhang | B26B 15/00 30/228 |
| 2015/0000491 | A1 | 1/2015 | Figiel et al. | |
| 2021/0299895 | A1 * | 9/2021 | Foreman | B26B 15/00 |

FOREIGN PATENT DOCUMENTS

| | | |
|---|---|---|
| EP | 3 103 598 A1 | 12/2016 |
| FR | 2503000 A1 | 10/1982 |
| JP | S49-143087 U | 12/1974 |
| JP | S64-43865 U | 3/1989 |
| JP | H04-118921 U | 10/1992 |
| JP | 2005-087642 A | 4/2005 |
| JP | 2006-068839 A | 3/2006 |
| JP | 2006-230263 A | 9/2006 |

* cited by examiner

ELECTRIC SCISSORS

CROSS REFERENCE TO RELATED APPLICATIONS

This application claims priority to Japanese Patent Application No. 2020-080673 filed on Apr. 30, 2020, the content of which is incorporated herein by reference.

TECHNICAL FIELD

The present invention relates to electric scissors configured to cut a to-be-cut object such as a reinforcing bar by using a drive force of a motor.

BACKGROUND ART

FIG. 16 illustrates an example of arrangement of reinforcing bars in a concrete structure. For concrete structures, reinforcing bars are used so as to improve strength. As shown in FIG. 16, reinforcing bars S are arranged in a lattice shape, and intersection points thereof are bound with wires. On construction sites, end portions E1 of the reinforcing bars S arranged in this way are cut in some cases. In some cases, the two reinforcing bars S at a lattice-shaped lattice place E2 are cut at four places so that a pipe and the like can pass through.

Scissors configured to cut a round bar-shaped to-be-cut object by a pair of movable blades have a configuration of pressing and cutting diametrically the round bar by acute-angled blade edges. While cutting the round bar by the pair of movable blades, a cutting load, which is applied in a vertical direction relative to an extension direction of the round bar, and a load, which tears off the round bar in the extension direction of the round bar that is the vertical direction relative to the cutting load, are generated.

With the scissors of the related art, it is not possible to suppress the round bar from moving due to the load that tears off the round bar in the vertical direction relative to the cutting load. Thereby, when the reinforcing bars S arranged as shown in FIG. 16 are cut at the cutting places by the pair of movable blades, the reinforcing bars S are applied with a force of moving the same in the extension direction, so that the cut reinforcing bars S are scattered.

In contrast, as for nippers configured to cut a relatively thin wire rod such as an electric wire and a wire and to be opened and closed by a hand, suggested is a technology of providing a cutting blade with a wire rod sandwiching member configured to hold the wire rod with an elastic force so as to prevent the wire rod cut as a to-be-cut object from being scattered (for example, refer to JP S64-43865 U).

On the other hand, in order to cut a reinforcing bar and a thick round bar, which are to-be-cut objects, it is necessary to apply a higher cutting force. As described above, while cutting the round bar by the pair of movable blades, a reactive force to the cutting load applied in the vertical direction relative to the extension direction of the round bar is applied to the movable blades. For this reason, when the higher cutting force is applied, the scissors are tilted relative to the round bar. For this reason, a worker should press the scissors so that the scissors are not tilted.

Therefore, suggested is a technology of preventing a pipe, which is a to-be-cut object, from being tilted by providing pressing members configured to hold the pipe by urging of torsion springs on both sides of a cutting blade (for example, refer to JP 2005-87642 A).

However, in the configuration where the to-be-cut object is pressed using the urging of the spring, it is necessary to provide a further stronger torsion spring so as to cut a round bar having a large diameter, which increases a size of a tool and deteriorates operability of the tool.

The present invention has been made in view of the above situations, and an object thereof is to provide electric scissors capable of holding a to-be-cut object and regulating a direction of the to-be-cut object with respect to a movable blade with a simple configuration.

SUMMARY OF INVENTION

Electric scissors according to an aspect of the present invention includes: at least one movable blade having a blade portion configured to cut a to-be-cut object; a drive unit configured to open and close the at least one movable blade; a holding part configured to hold the to-be-cut object that is cut by the at least one movable blade, and a support part configured to support the to-be-cut object, which is cut by the at least one movable blade, while regulating a direction of the to-be-cut object.

In the aspect of the present invention, the to-be-cut object is cut by the movable blade in a state where a direction of the to-be-cut object, which is to be cut by the movable blade, is regulated by the support part and the to-be-cut object is held by the holding part.

According to the aspect of the present invention, while cutting the to-be-cut object by the movable blade, the to-be-cut object is suppressed from being tilted with respect to the movable blade, so that the electric scissors can be suppressed from being tilted with respect to the to-be-cut object. In addition, the to-be-cut object is held by the holding part while cutting the to-be-cut object by the movable blade, and the cut to-be-cut object can be held by the electric scissors even after the to-be-cut object is cut, so that it is possible to prevent the to-be-cut object from being scattered.

DESCRIPTION OF EMBODIMENTS

Hereinbelow, embodiments of the electric scissors of the present invention will be described with reference to the drawings.

<Configuration Example of Electric Scissors>

Figure 1:
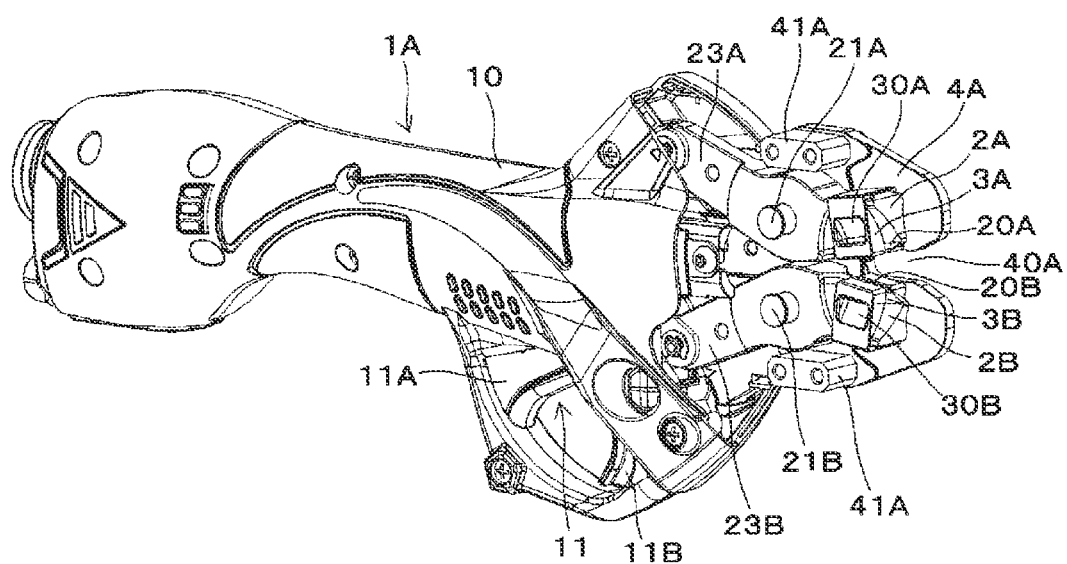
FIG. 1 is a partially broken perspective view depicting an example of electric scissors of the present embodiment.
Figure 2:
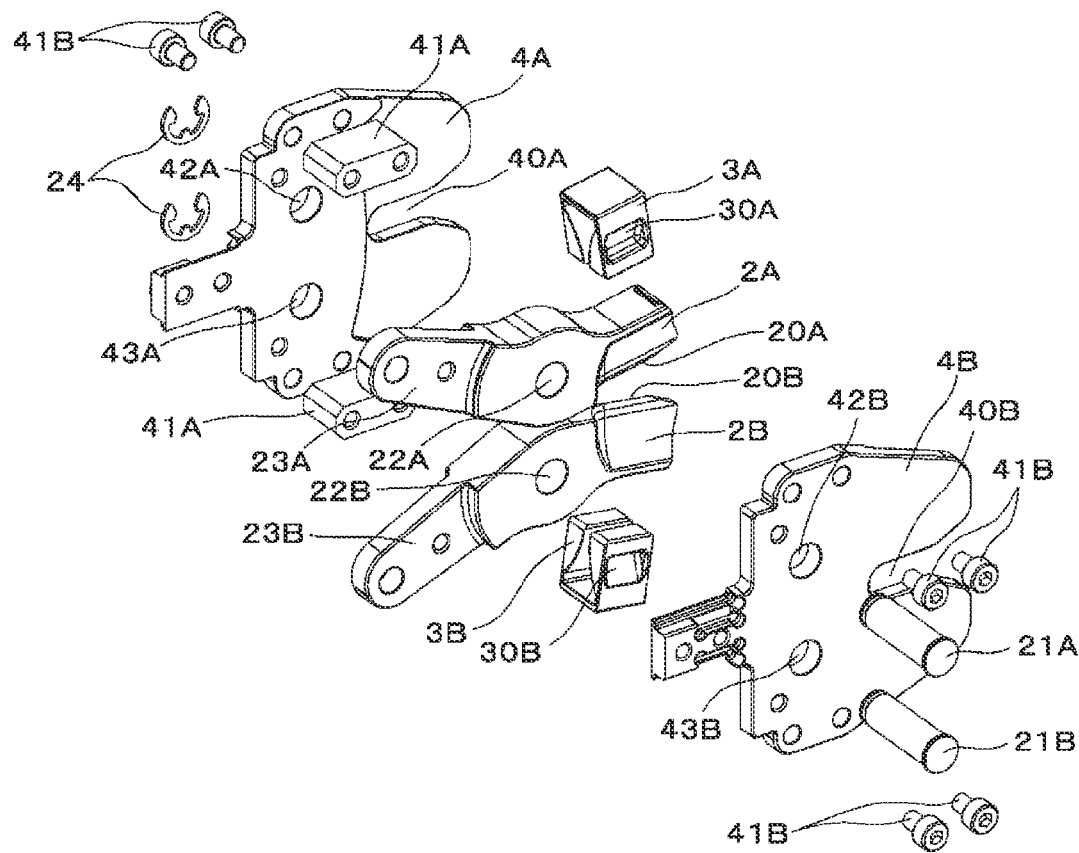
FIG. 2 is an exploded perspective view of main parts depicting the example of the electric scissors of the present embodiment.
Figure 3:
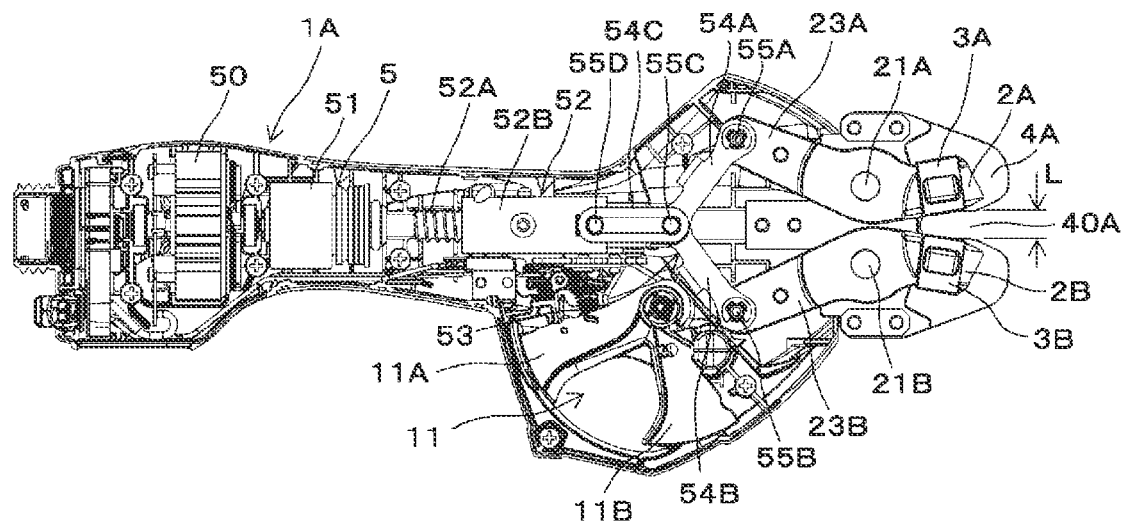
FIG. 3 is a side sectional view depicting the example of the electric scissors of the present embodiment.
Figure 4:
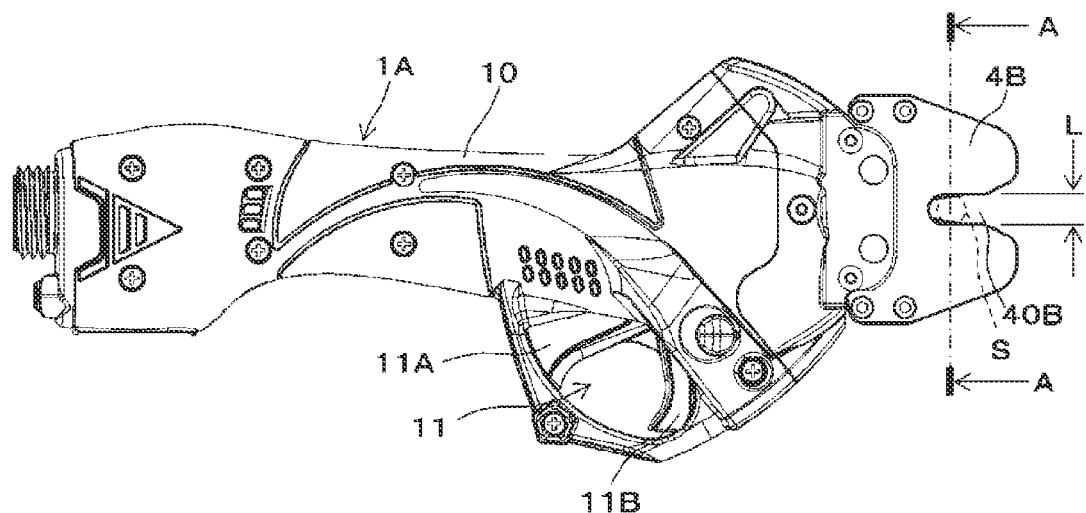
FIG. 4 is a side view depicting the example of the electric scissors of the present embodiment.
Figure 5:
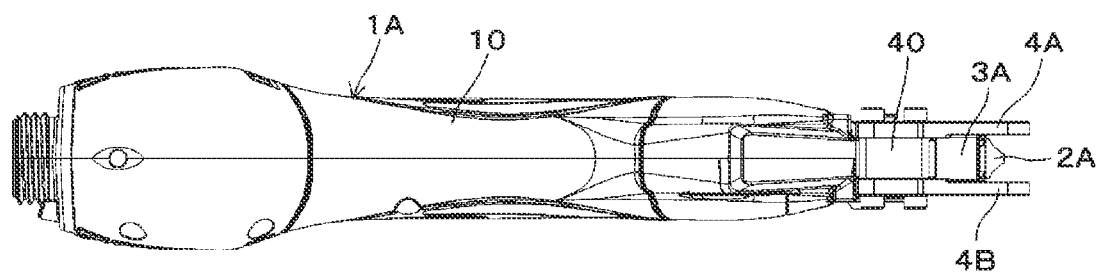
FIG. 5 is a top view depicting the example of the electric scissors of the present embodiment.
Figure 6:
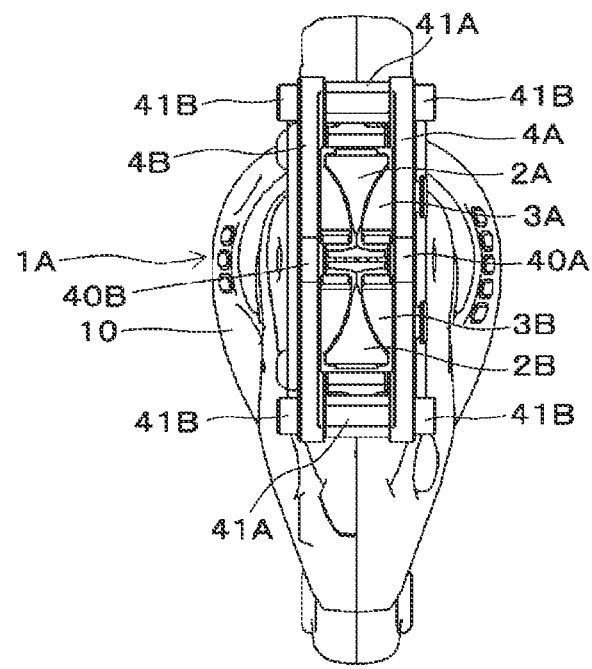
FIG. 6 is a front view depicting the example of the electric scissors of the present embodiment.
Figure 7:
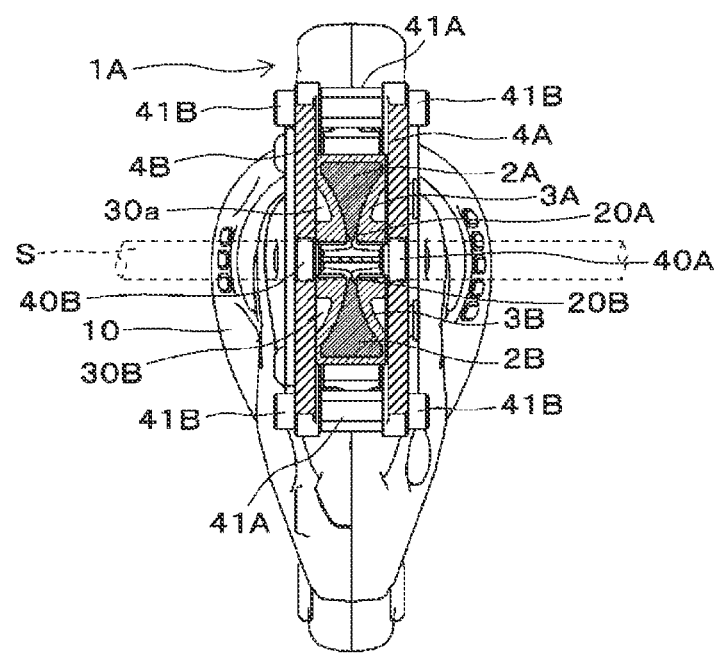
FIG. 7 is a sectional view taken along a line A-A of FIG. 4, depicting the example of the electric scissors of the present embodiment.

FIG. 1 is a partially broken perspective view depicting an example of electric scissors of the present embodiment, and FIG. 2 is an exploded perspective view of main parts depicting the example of the electric scissors of the present embodiment. FIG. 3 is a side sectional view depicting the example of the electric scissors of the present embodiment, FIG. 4 is a side view depicting the example of the electric scissors of the present embodiment, and FIG. 5 is a top view depicting the example of the electric scissors of the present embodiment. FIG. 6 is a front view depicting the example of the electric scissors of the present embodiment, and FIG. 7 is a sectional view taken along a line A-A of FIG. 4, depicting the example of the electric scissors of the present embodiment.

Electric scissors 1A of the present embodiment include a first movable blade 2A and a second movable blade 2B, which are a pair of movable blades, a first holding part 3A and a second holding part 3B configured to hold a reinforcing bar S, which is a to-be-cut object to be cut by the first movable blade 2A and the second movable blade 2B, and a first support part 4A and a second support part 4B configured to suppress the reinforcing bar S from being tilted with respect to the first movable blade 2A and the second movable blade 2B and to suppress the first holding part 3A and the second holding part 3B from being deformed in a direction other than a desired direction. The electric scissors 1A also include a drive unit 5 configured to drive the first movable blade 2A and the second movable blade 2B.

The first movable blade 2A has a blade portion 20A, which is formed in a plate-shaped member made of steel or the like and having a predetermined shape and has a wedge-shaped section toward one side and an acute-angled blade edge. The second movable blade 2B has a blade portion 20B, which is formed in a plate-shaped member made of steel or the like and having a predetermined shape and has a wedge-shaped section toward one side and an acute-angled blade edge.

The first movable blade 2A is rotatably supported by a shaft 21A supported to the first support part 4A and the second support part 4B. The first movable blade 2A is formed with a shaft hole portion 22A in which the shaft 21A is inserted, and has the blade portion 20A formed on one side with the shaft hole portion 22A being interposed therebetween and a link part 23A formed on the other side with the shaft hole portion 22A being interposed therebetween and coupled to the drive unit 5.

The second movable blade 2B is rotatably supported by a shaft 21B supported to the first support part 4A and the second support part 4B in a direction parallel to the shaft 21A. The second movable blade 2B is formed with a shaft hole portion 22B in which the shaft 21B is inserted, and has the blade portion 20B formed on one side with the shaft hole portion 22B being interposed therebetween and a link part 23B formed on the other side with the shaft hole portion 22B being interposed therebetween and coupled to the drive unit 5.

As for the first movable blade 2A and the second movable blade 2B, an extension direction of the blade portion 20A and an extension direction of the blade portion 20B are parallel. In addition, as for the first movable blade 2A and the second movable blade 2B, a position of the blade portion 20A along an axis direction of the shaft 21A and a position of the blade portion 20B along an axis direction of the shaft 21B overlap.

During a rotating operation about the shaft 21A as a support point, the first movable blade 2A is moved in directions in which the blade portion 20A comes close to and gets away from the blade portion 20B of the second movable blade 2B. In addition, during a rotating operation about the shaft 21B as a support point, the second movable blade 2B is moved in directions in which the blade portion 20B comes close to and gets away from the blade portion 20A of the first movable blade 2A.

The first movable blade 2A and the second movable blade 2B are moved away from each other, so that a gap, in which a reinforcing bar S is inserted, is formed between the blade portion 20A of the first movable blade 2A and the blade portion 20B of the second movable blade 2B. In addition, the first movable blade 2A and the second movable blade 2B are moved toward each other, so that the blade portion 20A of the first movable blade 2A and the blade portion 20B of the second movable blade 2B are contacted to each other.

The first holding part 3A is constituted by an elastic member. The first holding part 3A is opened at a portion facing the blade portion 20A of the first movable blade 2A, is attached to the first movable blade 2A in such an aspect of covering both sides of the first movable blade 2A and a back portion of the first movable blade 2A opposite to the blade portion 20A, and is configured to operate in conjunction with opening and closing of the first movable blade 2A. Note that, the first holding part 3A may also be provided on both sides or one side of the first movable blade 2A in a vertical direction relative to the opening and closing direction of the first movable blade 2A.

An inner surface-side of the first holding part 3A, which faces the blade portion 20A of the first movable blade 2A, has a shape conforming to the blade portion 20A of the first movable blade 2A having a wedge-shaped section. An outer surface-side of the first holding part 3A, which faces the first support part 4A and the second support part 4B, is formed with concave portions 30A for assisting elastic deformation and restoration of the first holding part 3A.

The second holding part 3B is constituted by an elastic member. The second holding part 3B is opened at a portion facing the blade portion 20B of the second movable blade 2B, is attached to the second movable blade 2B in such an aspect of covering both sides of the second movable blade 2B and a back portion of the second movable blade 2B opposite to the blade portion 20B, and is configured to operate in conjunction with opening and closing of the second movable blade 2B. Note that, the second holding part 3B may also be provided on both sides or one side of the second movable blade 2B in a vertical direction relative to the opening and closing direction of the second movable blade 2B.

An inner surface-side of the second holding part 3B, which faces the blade portion 20B of the second movable blade 2B, has a shape conforming to the blade portion 20B of the second movable blade 2B having a wedge-shaped section. An outer surface-side of the second holding part 3B, which faces the first support part 4A and the second support part 4B, is formed with concave portions 30B for assisting elastic deformation and restoration of the second holding part 3B.

A surface of the first holding part 3A, which faces the second holding part 3B attached to the second movable blade 2B, is located in a substantially equal position as the blade portion 20A of the first movable blade 2A. The first movable blade 2A protrudes from the first holding part 3A as the first holding part 3A is elastically deformed. A surface of the second holding part 3B, which faces the first holding part 3A attached to the first movable blade 2A, is located in a substantially equal position as the blade portion 20B of the second movable blade 2B. The second movable blade 2B protrudes from the second holding part 3B as the second holding part 3B is elastically deformed.

The first holding part 3A and the second holding part 3B may be formed of urethane, nitrile rubber, chloroprene rubber, ethylene rubber, butyl rubber, fluorine-contained rubber, silicon rubber, high-strength silicon rubber and the like, for example, and urethane is preferably used from viewpoints of compressive stress, hardness, friction coefficient and the like of an elastic body.

The first support part 4A and the second support part 4B are made of metal plates such as iron. The first support part 4A has a groove portion 40A in which the reinforcing bar S is inserted. An opened width L of the groove portion 40A is set slightly greater than a diameter (refer to FIG. 4) of the reinforcing bar S to be cut. The second support part 4B has a groove portion 40B in which the reinforcing bar S is inserted. An opened width L of the groove portion 40B is set slightly greater than the diameter of the reinforcing bar S to be cut.

The first support part 4A and the second support part 4B are fixed to a housing 10 in a state where the first support part 4A and the second support part 4B are fixed to coupling members 41A inserted therebetween by screws 41B and an interval between the first support part 4A and the second support part 4B is kept by the coupling members 41A.

The groove portion 40A of the first support part 4A and the groove portion 40B of the second support part 4B are provided in positions along the axis directions of the shaft 21A and the shaft 21B with respect to a space between the blade portion 20A and the blade portion 20B opened as the first movable blade 2A and the second movable blade 2B are rotated away from each other. Thereby, the reinforcing bar S inserted between the groove portion 40A of the first support part 4A and the groove portion 40B of the second support part 4B is introduced between the blade portion 20A of the first movable blade 2A and the blade portion 20B of the second movable blade 2B in an opened state.

The first support part 4A is provided at a part facing one side surfaces in the vertical direction relative to the opening and closing direction of the first movable blade 2A and the first holding part 3A and one side surfaces in the vertical direction relative to the opening and closing direction of the second movable blade 2B and the second holding part 3B. Also, the second support part 4B is provided at a part facing the other side surfaces of the first movable blade 2A and the first holding part 3A and the other side surfaces of the second movable blade 2B and the second holding part 3B. An interval between the first support part 4A and the second support part 4B is substantially equal to a width of the first holding part 3A in the axis direction of the shaft 21A and a width of the second holding part 3B in the axis direction of the shaft 21B, and the first support part 4A is in contact with one side surfaces of the first holding part 3A and the second holding part 3B. Also, the second support part 4B is in contact with the other side surfaces of the first holding part 3A and the second holding part 3B.

The first support part 4A is provided with holes 42A and 43A in which one end portions of the shaft 21A and the shaft 21B are inserted, and the second support part 4B is provided with holes 42B and 43B in which the other end portions of the shaft 21A and the shaft 21B are inserted.

The shaft 21A and the shaft 21B are each fixed via E-rings 24 so that they do not come off from the first support part 4A and the second support part 4B. Thereby, both axial ends of the shaft 21A and the shaft 21B are supported by the first support part 4A and the second support part 4B, so that occurrence of inclination of the axis line between the shaft 21A and the shaft 21B is suppressed.

The drive unit 5 includes a motor 50, a decelerator 51, a feed screw mechanism 52, and a toggle link mechanism 53. A drive shaft of the motor 50 is coupled to the decelerator 51 using a planetary gear, for example. The feed screw mechanism 52 has a screw shaft 52A coupled to an output shaft of the decelerator 51, and a movable member 52B having a convex part (not shown) engaged to a screw groove of the screw shaft 52A.

In the feed screw mechanism 52, when the screw shaft 52A is rotationally driven, the movable member 52B is linearly moved along the screw shaft 52A. Thereby, in the feed screw mechanism 52, a rotating operation of the motor 50 is converted into a linear operation of the movable member 52B, and a moving direction of the movable member 52B is switched according to a rotating direction of the motor 50.

The toggle link mechanism 53 has a link part 54A rotatably coupled to the link part 23A of the first movable blade 2A, a link part 54B rotatably coupled to the link part 23B of the second movable blade 2B, and a link part 54C configured to couple the link part 54A and link part 54B and the movable member 52B.

The link part 23A and the link part 54A are coupled to be rotatable about a shaft 55A as a support point. The link part 23B and the link part 54B are coupled to be rotatable about a shaft 55B as a support point. The link part 54A and link part 54B and the link part 54C are coupled to be rotatable about a shaft 55C as a support point, and the link part 54C and the movable member 52B are coupled to be rotatable about a shaft 55D as a support point.

In the toggle link mechanism 53, the link part 23A of the first movable blade 2A and the link part 54A form a bent shape at a coupled part by the shaft 55A, and the link part 23B of the second movable blade 2B and the link part 54B form a bent shape at a coupled part by the shaft 55B, according to a position of the movable member 52B.

In the first movable blade 2A and the second movable blade 2B, the link part 23A and the link part 54A form a bent shape at the coupled part by the shaft 55A, and the link part 23B and the link part 54B form a bent shape at the coupled part by the shaft 55B. In the first movable blade 2A and the second movable blade 2B, when an angle between the link part 23A and the link part 54A and an angle between the link part 23B and the link part 54B are opened, a gap in which the reinforcing bar S is introduced is formed between the blade portion 20A the blade portion 20B.

In the toggle link mechanism 53, the angle between the link part 23A and the link part 54A at the coupled part by the shaft 55A is closed and the angle between the link part 23B and the link part 54B at the coupled part by the shaft 55B is closed by movement of the movable member 52B.

When the first movable blade 2A rotates about the shaft 21A as a support point in a direction in which the angle between the link part 23A and the link part 54A is closed and the second movable blade 2B rotates about the shaft 21B as a support point in a direction in which the angle between the link part 23B and the link part 54B and is closed, the first movable blade 2A and the second movable blade 2B are moved in a direction in which the blade portions thereof come close to each other, so that the blade portion 20A and the blade portion 20B are contacted to each other.

The electric scissors 1A include an operation unit 11 configured to perform the opening and closing operations of the first movable blade 2A and the second movable blade 2B. The operation unit 11 has a first switch 11A and a second switch 11B configured to control a rotating direction, a rotating amount and a rotating speed of the motor 50.

The electric scissors 1A may have such an aspect that a power supply unit such as a battery for supplying electricity to the motor 50 and the like is provided independently of the electric scissors 1A and the electric scissors 1A and the power supply unit are connected by a cable. The electric scissors 1A may also have such a configuration that a power supply unit such as a battery for supplying electricity to the motor 50 and the like is detachably mounted to the electric scissors 1A. In this case, charging is performed in a state where the power supply unit is detached from the electric scissors 1A. The electric scissors 1A may also have such a configuration that a power supply unit such as a battery for supplying electricity to the motor 50 and the like is embedded in the electric scissors 1A. In this case, the power supply unit is charged in a state where the electric scissors 1A and a charger are connected to each other.

<Example of Operation of Electric Scissors>

Figure 8A:
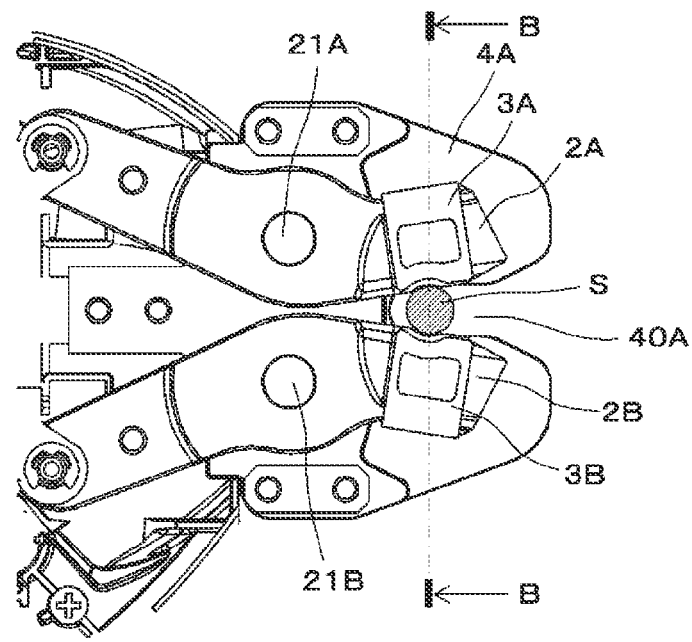
FIG. 8A is a side sectional view of main parts depicting an example of an operation of the electric scissors of the present embodiment.
Figure 8B:
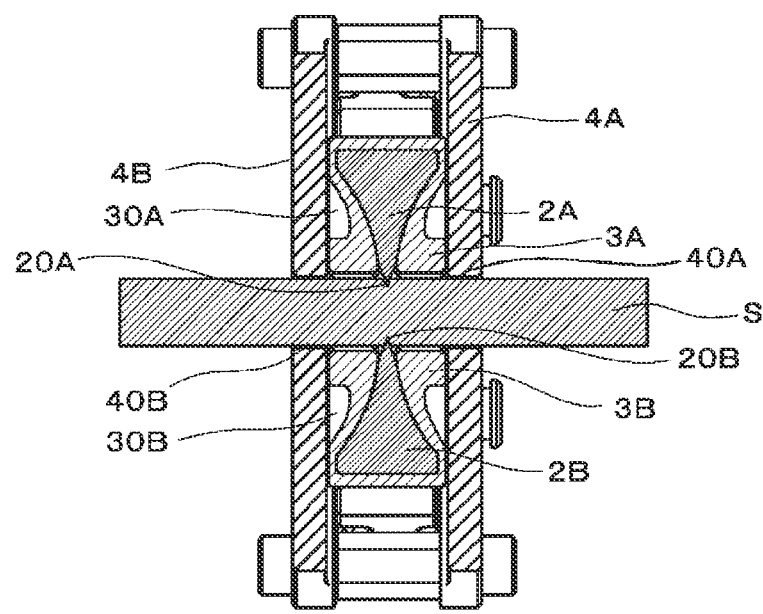
FIG. 8B is a sectional view taken along a line B-B of FIG. 8A, depicting an example of the operation of the electric scissors of the present embodiment.
Figure 9A:
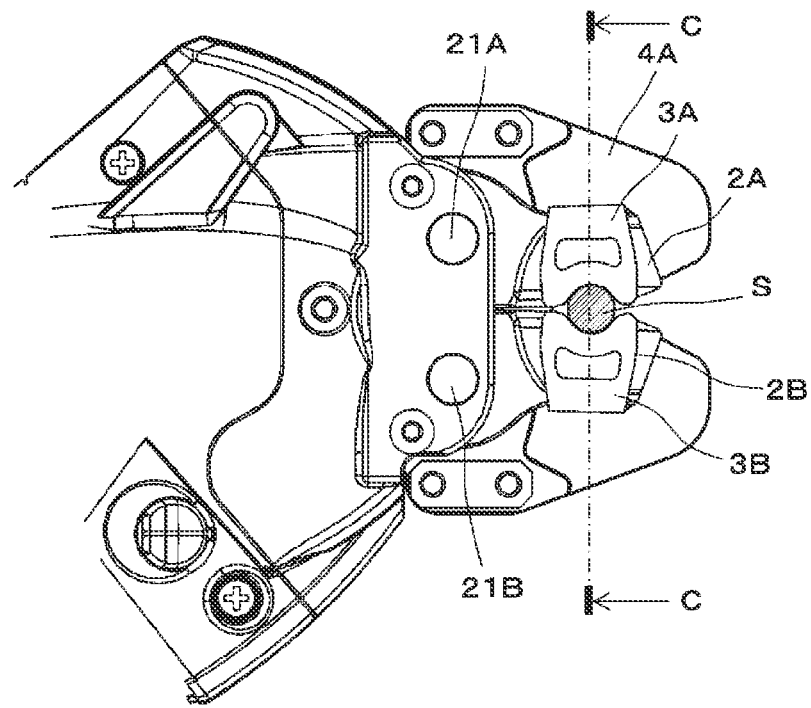
FIG. 9A is a side sectional view of main parts depicting an example of the operation of the electric scissors of the present embodiment.
Figure 9B:
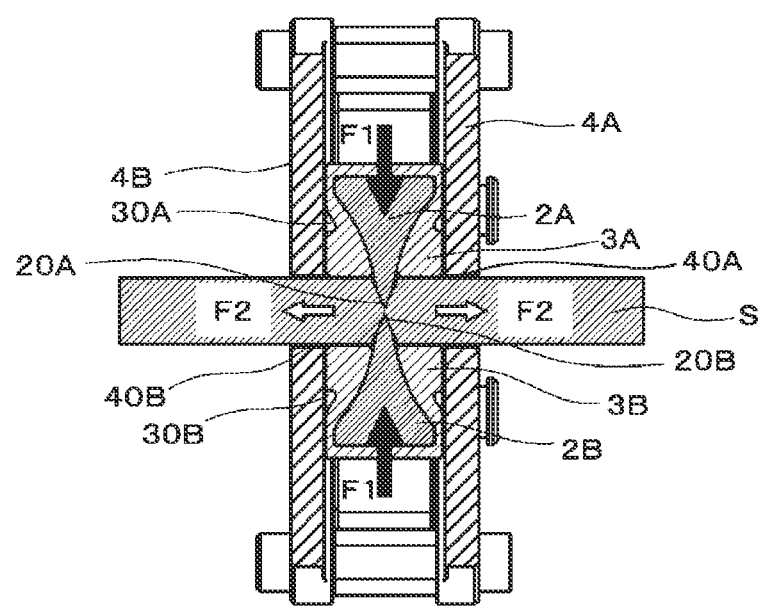
FIG. 9B is a sectional view taken along a line C-C of FIG. 9A, depicting an example of the operation of the electric scissors of the present embodiment.
Figure 10:
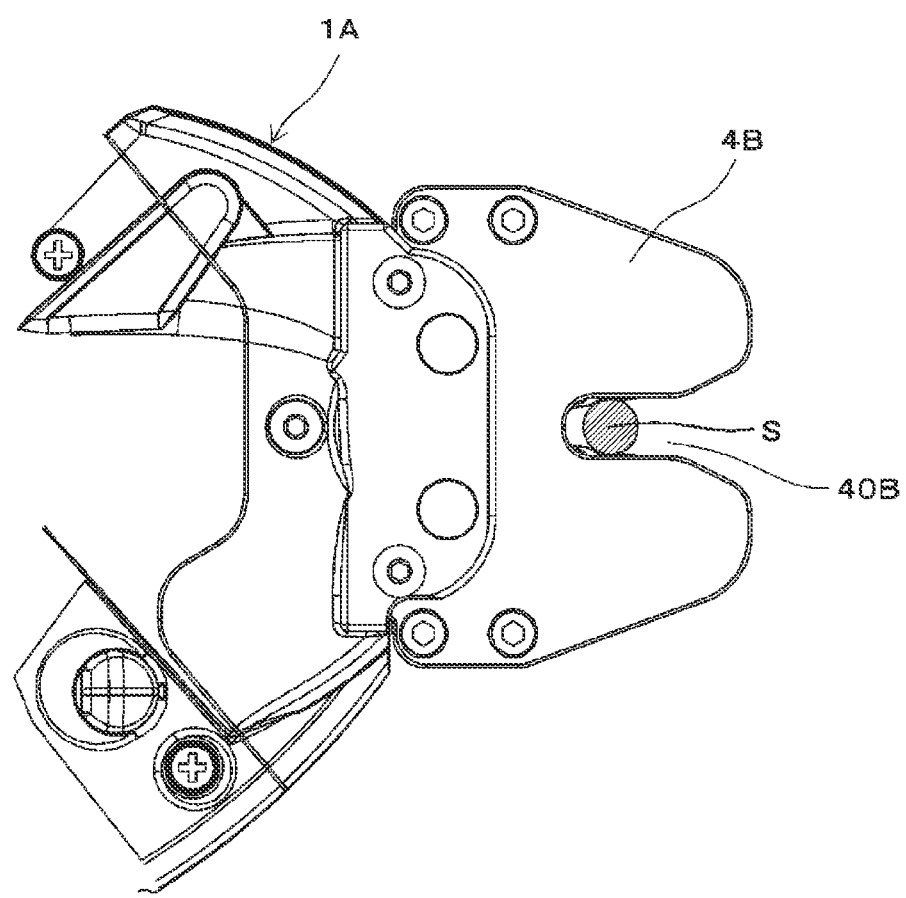
FIG. 10 is a side view of main parts depicting an example of the operation of the electric scissors of the present embodiment.

FIG. 8A is a side sectional view of main parts depicting an example of an operation of the electric scissors of the present embodiment, and FIG. 8B is a sectional view taken along a line B-B of FIG. 8A, depicting an example of the operation of the electric scissors of the present embodiment. FIG. 9A is a side sectional view of main parts depicting an example of the operation of the electric scissors of the present embodiment, and FIG. 9B is a sectional view taken along a line C-C of FIG. 9A, depicting an example of the operation of the electric scissors of the present embodiment. FIG. 10 is a side view of main parts depicting an example of the operation of the electric scissors of the present embodiment.

In a standby state of the electric scissors 1A, a gap in which the reinforcing bar S is introduced is formed between the blade portion 20A of the first movable blade 2A and the blade portion 20B of the second movable blade 2B. In this state, as shown in FIG. 10, when the reinforcing bar S is inserted into the groove portion 40A of the first support part 4A and the groove portion 40B of the second support part 4B, the reinforcing bar S is inserted between the blade portion 20A of the first movable blade 2A and the blade portion 20B of the second movable blade 2B, as shown in FIGS. 8A and 8B.

When the first switch 11A of the operation unit 11 is operated in the state where the reinforcing bar S is inserted between the blade portion 20A and the blade portion 20B, the motor 50 rotates in a predetermined direction. The rotation of the motor 50 is converted into movement of the movable member 52B by the screw shaft 52A and the movable member 52B of the feed screw mechanism 52, and the movement of the movable member 52B is transmitted to the first movable blade 2A and the second movable blade 2B by the toggle link mechanism 53. Thereby, the first movable blade 2A rotates about the shaft 21A as a support point and the second movable blade 2B rotates about the shaft 21B as a support point in the direction in which the blade portion 20A of the first movable blade 2A and the blade portion 20B of the second movable blade 2B come close to each other.

The first movable blade 2A and the second movable blade 2B are moved in the direction in which the blade portion 20A and the blade portion 20B come close to each other, so that the blade portion 20A presses and cuts the reinforcing bar S from one side of the reinforcing bar S in a diametrical direction, and the blade portion 20B presses and cuts the reinforcing bar S from the other side of the reinforcing bar S in the diametrical direction, thereby starting cutting the reinforcing bar S.

Figure 11A:
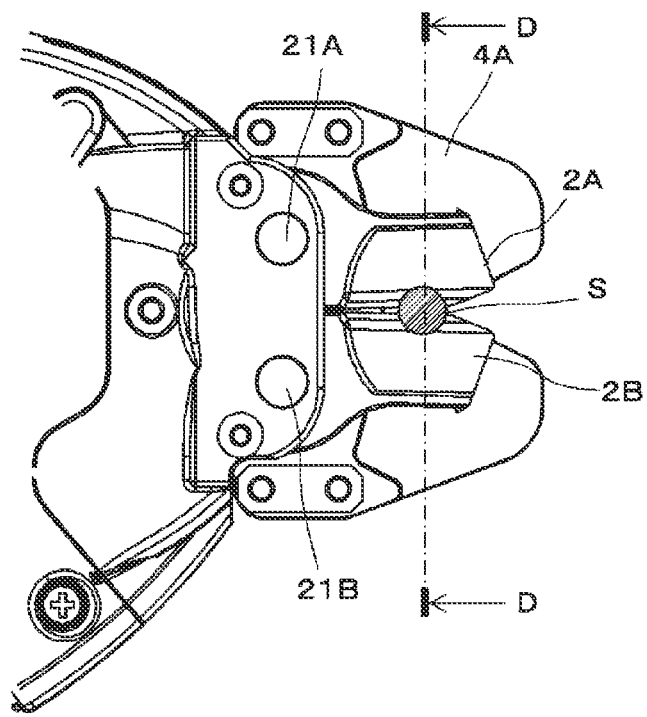
FIG. 11A is a side view of main parts of electric scissors depicting a problem of the related art.
Figure 11B:
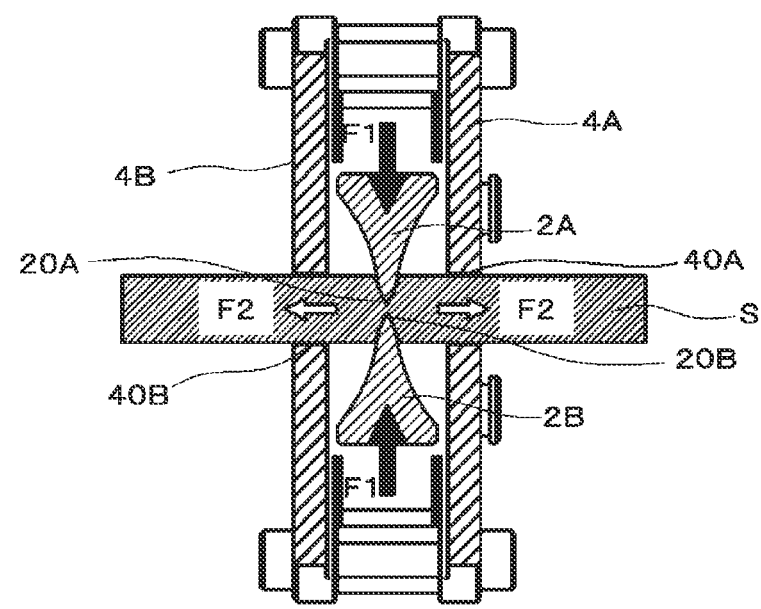
FIG. 11B is a sectional view taken along a line D-D of FIG. 11A, depicting the problem of the related art.

FIG. 11A is a side view of main parts of electric scissors depicting a problem of the related art, and FIG. 11B is a sectional view taken along a line D-D of FIG. 11A, depicting the problem of the related art.

While cutting the reinforcing bar S by the first movable blade 2A and the second movable blade 2B, as shown in FIG. 11B, a cutting load F1, which is applied in a vertical direction relative to an extension direction of the reinforcing bar S, and a load F2, which tears off the reinforcing bar S in the extension direction of the reinforcing bar S that is the vertical direction relative to the cutting load F1, are generated.

As shown in FIGS. 11A and 11B, in a configuration where the first movable blade 2A and the second movable blade 2B are not provided with the holding parts, it is not possible to suppress the reinforcing bar S from moving due to the load F2 that tears off the reinforcing bar S in the vertical direction relative to the cutting load F1. Thereby, the cut reinforcing bar S is scattered.

In contrast, in the configuration where the first movable blade 2A and the second movable blade 2B are provided with the holding parts, while the blade portion 20A of the first movable blade 2A presses and cuts the reinforcing bar S, the first holding part 3A is pushed and elastically deformed by the reinforcing bar S, so that the blade portion 20A protrudes from the first holding part 3A. Also, while the blade portion 20B of the second movable blade 2B presses and cuts the reinforcing bar S, the second holding part 3B is pushed and elastically deformed by the reinforcing bar S, so that the blade portion 20B protrudes from the second holding part 3B.

On the other hand, the first holding part 3A diametrically pushes the reinforcing bar S from one side by a restoring force, and the second holding part 3B diametrically pushes the reinforcing bar S from the other side by a restoring force. Thereby, during the rotating operation where the first movable blade 2A and the second movable blade 2B move in the direction in which the blade portion 20A and the blade portion 20B come close to each other, the first movable blade 2A and the second movable blade 2B sandwich and hold the reinforcing bar S between the first holding part 3A and the second holding part 3B.

The first movable blade 2A and the second movable blade 2B are moved to positions in which the blade portion 20A and the blade portion 20B are contacted to each other, thereby cutting the reinforcing bar S. While pushing and cutting the reinforcing bar S, since the reinforcing bar S is sandwiched and held between the first holding part 3A and the second holding part 3B, movement of the reinforcing bar S due to the load F2 that tears off the reinforcing bar S in the vertical direction relative to the cutting load F1 is suppressed by the first holding part 3A and the second holding part 3B, as shown in FIG. 9B. Thereby, the cut reinforcing bar S is suppressed from being scattered.

In addition, while the blade portion 20A presses and cuts the reinforcing bar S, when the first holding part 3A is pushed and elastically deformed by the reinforcing bar S, if the first holding part 3A is deformed in a direction in which it bulges outward along the extension direction of the reinforcing bar S, the force by which the first holding part 3A diametrically pushes the reinforcing bar S from one side by the restoring force is weakened. Similarly, while the blade portion 20B presses and cuts the reinforcing bar S, when the second holding part 3B is pushed and elastically deformed by the reinforcing bar S, if the second holding part 3B is deformed in a direction in which it bulges outward along the extension direction of the reinforcing bar S, the force by which the second holding part 3B diametrically pushes the reinforcing bar S from one side by the restoring force is weakened.

In contrast, the first support part 4A is provided on one side part of the first movable blade 2A having the first holding part 3A attached thereto and the second movable blade 2B having the second holding part 3B attached thereto, and the second support part 4B is provided on the other side part of the first movable blade 2A having the first holding part 3A attached thereto and the second movable blade 2B having the second holding part 3B attached thereto.

Thereby, while the blade portion 20A presses and cuts the reinforcing bar S, when the first holding part 3A is pushed and elastically deformed by the reinforcing bar S, the outward bulging along the extension direction of the reinforcing bar S is suppressed by the first support part 4A and second support part 4B and deformation of the concave portions 30A provided to the first holding part 3A. Therefore, the first holding part 3A is elastically deformed in such an aspect of being compressed in the vertical direction relative to the extension direction of the reinforcing bar S. Thereby, the force by which the first holding part 3A diametrically pushes the reinforcing bar S from one side by the restoring force is increased.

In addition, while the blade portion 20B presses and cuts the reinforcing bar S, when the second holding part 3B is pushed and elastically deformed by the reinforcing bar S, the outward bulging along the extension direction of the reinforcing bar S is suppressed by the first support part 4A and second support part 4B and deformation of the concave portions 30B provided to the second holding part 3B. Therefore, the second holding part 3B is elastically deformed in such an aspect of being compressed in the vertical direction relative to the extension direction of the reinforcing bar S. Thereby, the force by which the second holding part 3B diametrically pushes the reinforcing bar S from one side by the restoring force is increased.

Note that, the material and hardness of the first holding part 3A and the second holding part 3B were selected in consideration of optimal states such as a pressing force against the reinforcing bar S and a deformed state that does not interfere with the cutting of the reinforcing bar S, from viewpoints of compressive stress, hardness, friction coefficient and the like of an elastic body. In the present embodiment, urethane (hardness Hs: 70°, compressive stress: 170 to 190 N/cm$^2$, dynamic friction coefficient: 0.624 to 0.648) was used for the first holding part 3A and the second holding part 3B.

Further, while the blade portion 20A and the blade portion 20B press and cut the reinforcing bar S, a reactive force to the cutting load F1 that is applied in the vertical direction relative to the extension direction of the reinforcing bar S is applied to the first movable blade 2A and the second movable blade 2B. In a configuration where the first support part 4A and the second support part 4B are not provided, the reinforcing bar S may be tilted with respect to each of the movable blades, so that the electric scissors are tilted with respect to the reinforcing bar S. For this reason, a worker should press the electric scissors so that the scissors are not tilted, which increases the burden.

In contrast, in the configuration where the first support part 4A having the groove portion 40A in which the reinforcing bar S is introduced is provided on one side part of the first movable blade 2A and the second movable blade 2B and the second support part 4B having the groove portion 40B in which the reinforcing bar S is introduced is provided on the other side part of the first movable blade 2A and the second movable blade 2B, a position of the reinforcing bar S is regulated on both sides of the first movable blade 2A and the second movable blade 2B along the axis directions of the shaft 21A and the shaft 21B.

Thereby, even when the reactive force to the cutting load F1 that is applied in the vertical direction relative to the extension direction of the reinforcing bar S is applied to the first movable blade 2A and the second movable blade 2B, the reinforcing bar S is suppressed from being tilted with respect to the first movable blade 2A and the second movable blade 2B. Therefore, even though the worker does not apply the force for pressing the electric scissors 1A so that the scissors are not tilted, the electric scissors 1A are suppressed from being tilted with respect to the reinforcing bar S.

Therefore, the worker can perform the operation of cutting the reinforcing bar S with gripping the electric scissors 1A with one hand and can freely use the other hand, so that it is possible to secure favorable operability even in a cutting operation at a high place, for example. In addition, the cut reinforcing bar S can be suppressed from being scattered. Further, after cutting the reinforcing bar S, the closed state of the first movable blade 2A and the second movable blade 2B is kept by operating the operation unit 11, so that it is possible to keep a state where the reinforcing bar S is held by the electric scissors 1A. Therefore, the worker can move to a discard site while holding the cut reinforcing bar S with the electric scissors 1A, and operate the operation unit 11 to open the first movable blade 2A and the second movable blade 2B, thereby discarding the reinforcing bar S at the discard site. Therefore, it is possible to exclude operations of collecting the scattered reinforcing bars S and taking the same to the discard site for discard.

<Modified Embodiments of Electric Scissors>

Figure 12:
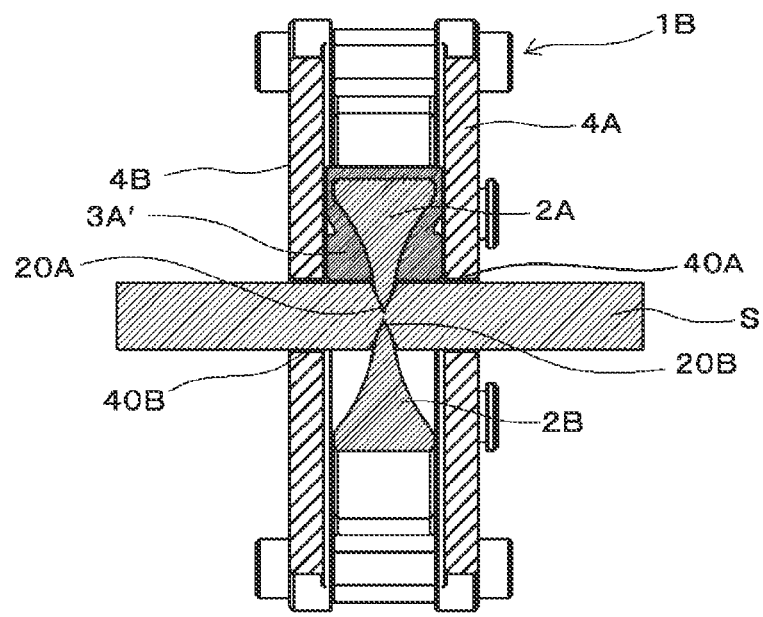
FIG. 12 is a front sectional view depicting a first modified embodiment of the electric scissors of the present embodiment.

FIG. 12 is a front sectional view depicting a first modified embodiment of the electric scissors of the present embodiment. Electric scissors 1B of the first modified embodiment have a configuration where one of the pair of movable blades is provided with a holding part and the other movable blade is not provided with a holding part. That is, in the electric scissors 1B, the first movable blade 2A is provided with a holding part 3A' and the second movable blade 2B is not provided with a holding part. Alternatively, although not shown, the second movable blade 2B may be provided with a holding part, and the first movable blade 2A may not be provided with a holding part. The holding part 3A' may have the same configuration as the first holding part 3A.

In the electric scissors 1B, while pressing and cutting the reinforcing bar S by the blade portion 20A of the first movable blade 2A and the blade portion 20B of the second movable blade 2B, the holding part 3A' is pushed and elastically deformed by the reinforcing bar S. On the other hand, the holding part 3A' pushes diametrically the reinforcing bar S from one side by a restoring force. Thereby, when the blade portion 20A of the first movable blade 2A and the blade portion 20B of the second movable blade 2B are moved toward each other, the reinforcing bar S is sandwiched and held between the holding part 3A' and the groove portion 40A of the first support part 4A and groove portion 40B of the second support part 4B. Thereby, the cut reinforcing bar S is suppressed from being scattered.

Figure 13:
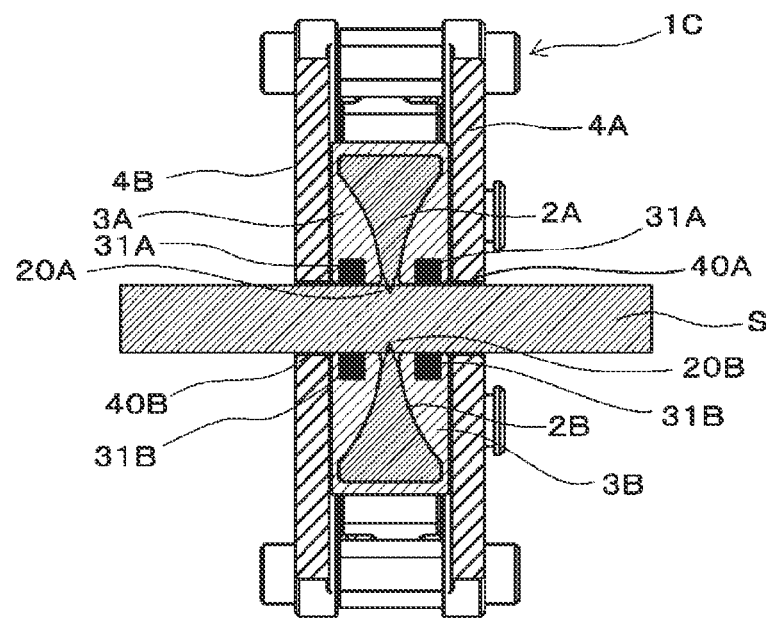
FIG. 13 is a front sectional view depicting a second modified embodiment of the electric scissors of the present embodiment.

FIG. 13 is a front sectional view depicting a second modified embodiment of the electric scissors of the present embodiment. Electric scissors 1C of the second modified embodiment include members having a magnetic force where the first holding part 3A has a magnet 31A, and the second holding part 3B has a magnet 31B. Note that, the first holding part 3A and the second holding part 3B may have a magnetic force as a whole.

In the electric scissors 1C, while pressing and cutting the reinforcing bar S by the blade portion 20A of the first movable blade 2A and the blade portion 20B of the second movable blade 2B, the first holding part 3A is pushed and elastically deformed by the reinforcing bar S. On the other hand, the holding part 3A pushes diametrically the reinforcing bar S from one side by a restoring force. The second holding part 3B is also pushed and elastically deformed by the reinforcing bar S. On the other hand, the second holding part 3B pushes diametrically the reinforcing bar S from the other side by a restoring force. In addition, the magnet 31A of the first holding part 3A is sucked to the reinforcing bar S, and the magnet 31B of the second holding part 3B is sucked to the reinforcing bar S.

Thereby, during the rotating operation where the blade portion 20A and the blade portion 20B are moved toward each other, the first movable blade 2A and the second movable blade 2B hold the reinforcing bar S between the first holding part 3A and the second holding part 3B by the elastic deformations of the first holding part 3A and the second holding part 3B and the magnets 31A and 31B. Therefore, the cut reinforcing bar S is suppressed from being scattered.

Figure 14:
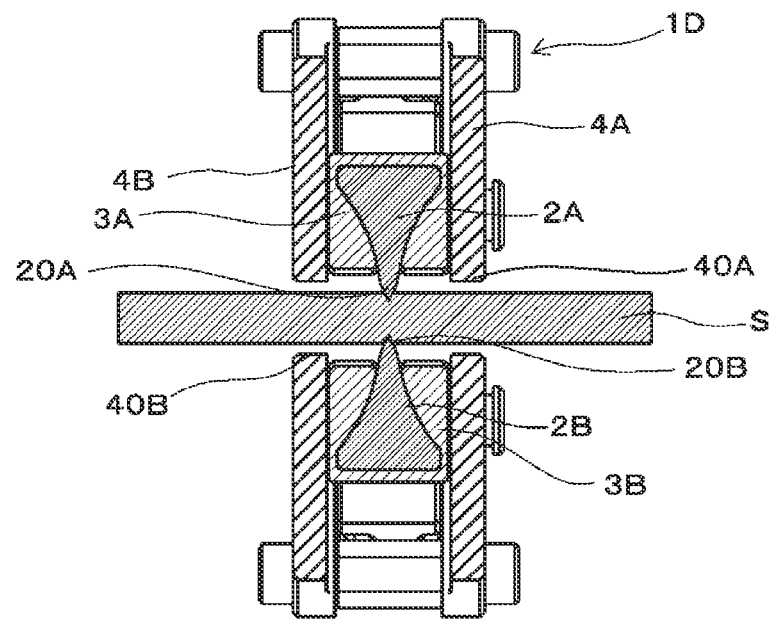
FIG. 14 is a front sectional view depicting a third modified embodiment of the electric scissors of the present embodiment.

FIG. 14 is a front sectional view depicting a third modified embodiment of the electric scissors of the present embodiment. In electric scissors 1D of the third modified embodiment, a position of a surface of the first holding part 3A facing the second holding part 3B is varied with respect to the blade edge of the blade portion 20A of the first movable blade 2A, according to the diameter of the reinforcing bar S. In addition, a position of a surface of the second holding part 3B facing the first holding part 3A is varied with respect to the blade edge of the blade portion 20B of the second movable blade 2B, according to the diameter of the reinforcing bar S.

For example, in a case where the diameter of the reinforcing bar S is large, a retreat amount of the first holding part 3A with respect to the blade edge of the blade portion 20A of the first movable blade 2A is increased and a retreat amount of the second holding part 3B with respect to the blade edge of the blade portion 20B of the second movable blade 2B is increased, thereby widening the interval between the first holding part 3A and the second holding part 3B. In contrast, when the diameter of the reinforcing bar S is small, the retreat amount of the first holding part 3A with respect to the blade edge of the blade portion 20A of the first movable blade 2A is reduced and the retreat amount of the second holding part 3B with respect to the blade edge of the blade portion 20B of the second movable blade 2B is reduced, thereby narrowing the interval between the first holding part 3A and the second holding part 3B.

Thereby, when the first holding part 3A and the second holding part 3B are elastically deformed, the amount of deformation is suppressed from being excessive or too small, and the reinforcing bar S can be securely held. In addition, the load is suppressed from being excessive when the first movable blade 2A and the second movable blade 2B are rotated.

Figure 15:
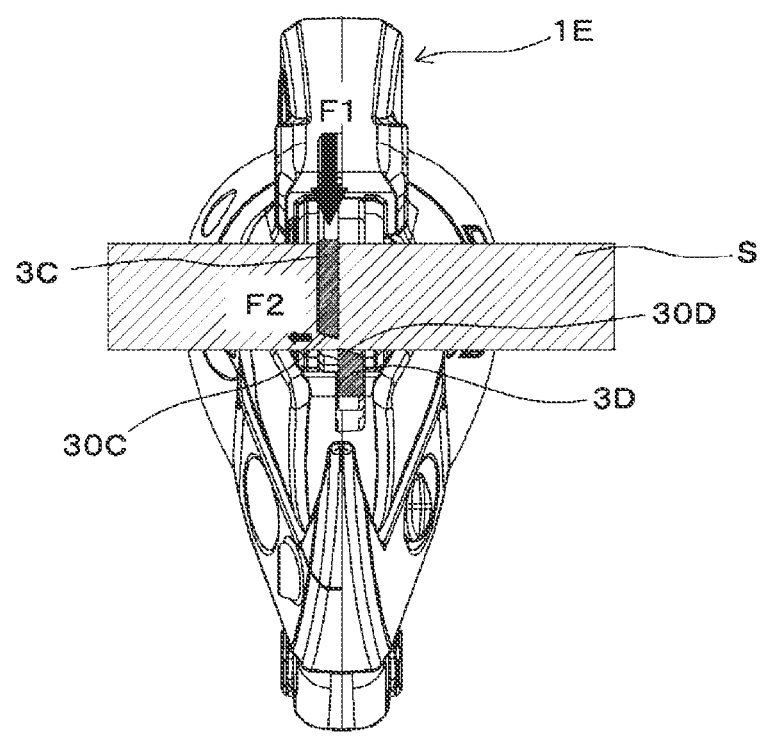
FIG. 15 is a front sectional view depicting a fourth modified embodiment of the electric scissors of the present embodiment.
Figure 16:
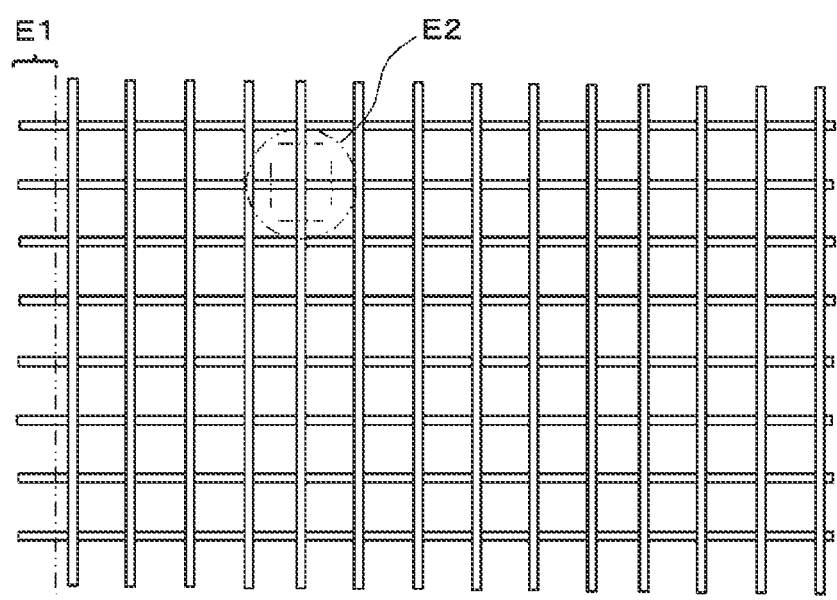
FIG. 16 illustrates an example of arrangement of reinforcing bars in a concrete structure.

FIG. 15 is a front sectional view depicting a fourth modified embodiment of the electric scissors of the present embodiment. In electric scissors 1E of the fourth modified embodiment, a blade edge of a blade portion 20C of a first movable blade 2C and a blade edge of a blade portion 20D of a second movable blade 2D are each formed to have an obtuse angle.

While cutting the reinforcing bar S by the first movable blade 2C and the second movable blade 2D, the cutting load F1, which is applied in the vertical direction relative to the extension direction of the reinforcing bar S, and the load F2, which tears off the reinforcing bar S in the extension direction of the reinforcing bar S that is the vertical direction relative to the cutting load F1, are generated. When the blade edge of the blade portion 20C of the first movable blade 2C and the blade edge of the blade portion 20D of the second movable blade 2D are formed to have an obtuse angle, the load F2 that tears off the reinforcing bar S is sufficiently reduced with respect to the cutting load F1. Thereby, the cut reinforcing bar S is dropped along the moving direction of the movable blade and is suppressed from being scattered.

What is claimed is:
1. Electric scissors comprising:
a pair of blades, each of the pair of blades having a blade portion configured to cut a to-be-cut object, and at least one of the pair of blades being a movable blade;
a drive unit configured to drive the movable blade such that the pair of blades open and close;
a first elastic holding part configured to hold the to-be-cut object that is cut by the pair of blades, the first elastic holding part attached to and movable together with the movable blade; and
a first support part and a second support part engaged with the pair of blades, the first and second support parts being configured to support the to-be-cut object and configured to suppress the to-be-cut object while being supported from being tilted with respect to the pair of blades, the first support part and the second support part each including a groove portion, which is configured to support the to-be-cut object inserted between the pair of blades in an opened state, wherein the first elastic holding part covers at least one of opposing sides of the movable blade in a direction orthogonal to an opening direction and a closing direction of the pair of blades, and comes into contact with the to-be-cut object when the pair of blades closes, thus holding the to-be-cut object, and wherein the first support part and the second support part are disposed apart from the pair of blades in the direction orthogonal to the opening direction and the closing direction of the pair of blades and is-are arranged not to move together with the movable blade.

2. The electric scissors according to claim 1, wherein the first support part comprises a first plate member and the second support part comprises a second plate member, wherein the first plate member is disposed on a-one side of the pair of blades in the direction orthogonal to the opening direction and the closing direction of the pair of blades, and the second plate member is provided on an opposing side of the pair of blades in the direction orthogonal to the opening direction and the closing direction of the pair of blades.

3. The electric scissors according to claim 1, wherein the first elastic holding part covers the opposing sides of the movable blade in the direction orthogonal to the opening direction and the closing direction of the pair of blades.

4. The electric scissors according to claim 3, wherein the first support part comprises a first plate member and the second support part comprises a second plate member, wherein the first plate member is disposed on one side of the pair of blades in the direction orthogonal to the opening direction and the closing direction of the pair of blades, and the second plate member is provided on an opposing side of the pair of blades in the direction orthogonal to the opening direction and the closing direction of the pair of blades, and wherein the first plate member and the second plate member are disposed on outer opposing sides of the first elastic holding part in the direction orthogonal to the opening direction and the closing direction of the pair of blades, and are in slidable contact with the first elastic holding part.

5. The electric scissors according to claim 1, wherein both of the pair of blades are movable blades, and wherein the electric scissors further comprise:

a second elastic holding part configured to hold the to-be-cut object that is cut by the pair of blades, the second elastic holding part attached to and movable together with one of the movable blades and the first elastic holding part attached to the other of the movable blades.

6. The electric scissors according to claim 1, wherein each groove portion is formed in a U shape having a pair of surfaces facing each other in the closing direction of the pair of blades.

7. The electric scissors according to claim 6, wherein each of the first support part and the second support part is disposed such that the corresponding groove portion aligns, in the direction orthogonal to the opening direction and the closing direction of the pair of blades, with a space between the pair of blades in the opened state.

\* \* \* \* \*